United States Patent
Ishaaya et al.

(10) Patent No.: US 10,141,709 B2
(45) Date of Patent: Nov. 27, 2018

(54) TRANSIENT BRAGG GRATINGS IN OPTICAL WAVEGUIDES AND THEIR APPLICATIONS

(71) Applicant: B. G. NEGEV TECHNOLOGIES AND APPLICATIONS LTD., AT BEN-GURION UNIVERSITY, Beer Sheva (IL)

(72) Inventors: Amiel Ishaaya, Ness Ziona (IL); Yonatan Sivan, Tel Aviv (IL)

(73) Assignee: B. G. Negev Technologies and Applications Ltd., at Ben-Gurion University, Beer Sheva (IL)

(*) Notice: Subject to any disclaimer, the term of this patent is extended or adjusted under 35 U.S.C. 154(b) by 0 days.

(21) Appl. No.: 15/550,214

(22) PCT Filed: Feb. 12, 2016

(86) PCT No.: PCT/IL2016/050171
§ 371 (c)(1),
(2) Date: Aug. 10, 2017

(87) PCT Pub. No.: WO2016/132349
PCT Pub. Date: Aug. 25, 2016

(65) Prior Publication Data
US 2018/0019564 A1 Jan. 18, 2018

Related U.S. Application Data

(60) Provisional application No. 62/117,972, filed on Feb. 19, 2015.

(51) Int. Cl.
*G02B 6/02* (2006.01)
*H01S 3/11* (2006.01)
(Continued)

(52) U.S. Cl.
CPC ............ *H01S 3/0675* (2013.01); *B29D 11/00* (2013.01); *B29D 11/00663* (2013.01);
(Continued)

(58) Field of Classification Search
CPC ........ G02B 6/02076–6/02095; G02B 6/02138; C03C 25/6208; C03C 25/6226
See application file for complete search history.

(56) References Cited

U.S. PATENT DOCUMENTS 5,367,588 A 11/1994 Hill
6,016,202 A * 1/2000 Fuchs ................... G01B 11/06
356/432

(Continued)

FOREIGN PATENT DOCUMENTS

JP 2003294956 A * 10/2003
JP 2008083670 A * 4/2008

OTHER PUBLICATIONS

Eggleton et al., "Inducing and Harnessing Stimulated Brillouin Scattering in Photonic Integrated Circuits", 2013, Advances in Optics and Photonics, 5, 536-587.*

(Continued)

*Primary Examiner* — Joshua King
(74) *Attorney, Agent, or Firm* — Roach Brown McCarthy & Gruber, P.C.; Kevin D. McCarthy

(57) ABSTRACT

A method for obtaining transient Bragg gratings in optical waveguides and several different applications of the transient Bragg gratings obtained using this method are presented. The basic mechanisms for obtaining the transient gratings in the waveguides are refractive index change due to Kerr nonlinearity, free carrier generation, and gratings formed by linear or non-linear absorption of thermal energy. The exemplary applications include an ultra-fast fiber laser source at any central wavelength, a fast spectral switch/
(Continued)

modulator, transient pulse stretchers based on transient chirped gratings, Q-switching based on transient gratings, and time reversal of ultra-short pulses and low power sub-nanosecond pulse generations.

21 Claims, 2 Drawing Sheets

(51) Int. Cl.
G02B 6/124 (2006.01)
H01S 3/067 (2006.01)
H01S 3/094 (2006.01)
H01S 3/16 (2006.01)
B29D 11/00 (2006.01)
C03C 25/6208 (2018.01)

(52) U.S. Cl.
CPC .... *B29D 11/00682* (2013.01); *C03C 25/6208* (2018.01); *G02B 6/02138* (2013.01); *G02B 6/124* (2013.01); *H01S 3/094003* (2013.01); *H01S 3/094076* (2013.01); *H01S 3/11* (2013.01); *B29D 11/00769* (2013.01); *H01S 3/1618* (2013.01)

(56) References Cited

U.S. PATENT DOCUMENTS

| | | | | |
|---|---|---|---|---|
| 6,188,478 B1* | 2/2001 | Fuchs | ................ | G01N 21/636 356/630 |
| 6,330,383 B1 | 12/2001 | Cai | | |
| 6,363,097 B1* | 3/2002 | Linke | ................ | H01S 5/141 359/3 |
| 6,795,198 B1* | 9/2004 | Fuchs | ................ | G01B 11/0666 356/521 |
| 8,380,027 B2* | 2/2013 | Reed | ................ | G02B 6/12007 385/37 |
| 2012/0250133 A1* | 10/2012 | Stewart | ................ | G02F 1/293 359/238 |

OTHER PUBLICATIONS

Eichler et al., "Diffraction Efficiency and Decay Times of Free-Carrier Gratings in Silicon", 1982, Journal of Applied Physics, 53, 3237.*

Andreas Othonos et al., "Fibre Bragg Gratings", Wavelength Filters in Fibre Optics (2006): 189-269 (81 pages).

S. Y. Li et al., "Thermally tunable narrow-bandpass filter based on a linearly chirped fiber Bragg grating", Optics Letters, Jan. 1, 2004 / vol. 29, No. 1, 29-31 (3 pages).

M.M. Ohn et al., "Dispersion variable fibre Bragg grating using a piezoelectric stack", Electronics Letters Oct. 10, 1996 vol. 32 No. 21, Jan. 2000 (2 pages).

Victor E. Perlin et al., "Nonlinear Pulse Switching Using Cross-Phase Modulation and Fiber Bragg Gratings", IEEE Photonics Technology Letters, vol. 13, No. 9, Sep. 2001, 960-2 (3 pages).

Andrea Melloni et al., "All-Optical Switching in Phase-Shifted Fiber Bragg Grating"; IEEE Photonics Technology Letters, vol. 12, No. 1, Jan. 2000; 42-4 (3 pages).

Masaya Notomi, "Manipulating light with strongly modulated photonic crystals", Rep. Prog. Phys. 73 (2010) 096501 (58 pages).

Andreas Othonos, "Probing ultrafast carrier and phonon dynamics in semiconductors". Journal of Applied Physics 83, 1789 (1998) (43 pages).

International Search Report for PCT/IL2016/050171, dated Apr. 18, 2016 (4 pages).

Written Opinion of the International Searching Authority for PCT/IL2016/050171, dated Apr. 18, 2016 (6 pages).

* cited by examiner

TRANSIENT BRAGG GRATINGS IN OPTICAL WAVEGUIDES AND THEIR APPLICATIONS

FIELD OF THE INVENTION

The present invention relates to the field of optical fibers and waveguides, lasers, and ultra-short pulses. Specifically, the invention relates to the field of (transient) gratings in optical waveguides and their applications.

BACKGROUND OF THE INVENTION

Publications and other reference materials referred to herein are numerically referenced in the following text and respectively grouped in the appended Bibliography which immediately precedes the claims.

A Fiber Bragg Grating (FBG) is periodic modulation of the fiber core refractive index, typically, a few millimeters long [1]. FBG's have a variety of commercial applications. In optical communication as wavelength filtering and add\drop multiplexers, in fiber lasers as reflective mirrors, in fiber sensors as very sensitive temperature and strain gauges, and in many more fields. All FBG's that are used today are permanent gratings inscribed in a fiber. Once they are written they cannot be "removed". Recently, there is a growing interest in FBG's for optical switching applications. Several works reported an implementation of an optical switch by tuning a pre-inscribed grating by means of heat stress and other relatively slow processes [2-5]. These methods are also based on permanent fiber gratings, and have several drawbacks due to inherent physical properties of their operation, which limits their applicability and performance. In the wider context, there have been several reports on switching of various photonic crystal structures both for fundamental and applicative purposes, see e.g., [6] for some recent reviews. In addition, several publications reported on transient Bragg gratings in gas for purposes of spectroscopy and in bulk semiconductors for studying free carrier recombination rates etc. [7]. However, to the best of our knowledge, no transient Bragg gratings in a fiber/waveguide (i.e., transient FBG) have been reported so far.

It is therefore a purpose of the present invention to provide a method of producing transient Bragg gratings in a fiber/waveguide.

It is another purpose of the present invention to provide examples of applications of the transient Bragg gratings obtained using this method.

Further purposes and advantages of this invention will appear as the description proceeds.

SUMMARY OF THE INVENTION

In a first aspect the invention is an optical setup for forming a transient Bragg grating in an optical waveguide. The optical setup comprises:
  a) an ultra-fast laser configured to emits high intensity ultra-fast pulses;
  b) a cylindrical lens configured to form radiation emitted by the laser into a line that is focused on the optical waveguide; and
  c) a phase mask located between the aperture and the optical waveguide;

The diffraction patterns created by the phase mask for each pulse interfere to create refractive index changes at high intensity points along the waveguide at a spatial period determined by the phase mask, the wavelength, and the specific material of the waveguide. These refractive index changes are reversed when the radiation ceases to be focused on the waveguide. In this way a transient Bragg grating is formed.

Embodiments of the optical setup of the invention comprise an aperture located between the cylindrical lens and the phase mask.

In embodiments of the optical setup of the invention the laser peak power is one of the following:
  a) lower than that required for permanent grating inscription; and
  b) higher than the saturation level of the fiber if the fiber has been pretreated using high peak power illumination so that its permanent index change is saturated.

In embodiments of the optical setup of the invention the mechanism by which the refractive index changes take place is at least one of the following:
  a) the Kerr nonlinearity;
  b) free-carrier generation; and
  c) linear or non-linear absorption of laser energy resulting in a thermal grating.

In a second aspect the invention is an ultra-short pulse generator comprising an optical setup of the first aspect of the invention used as an ultra-fast light modulator in an optical waveguide. Continuous wave (CW) laser radiation is injected into the optical waveguide via a circulator or a beam splitter and, for each pulse of the laser of the optical setup, a transient Bragg grating is formed in the waveguide reflecting the CW laser radiation back to the circulator or beam splitter which outputs a signal comprised of ultra-short laser pulses whose central wavelength is the same as that of the CW laser.

In embodiments of the ultra-short pulse generator of the invention the pulse duration is in the range between 200 ps to 1 ns.

In embodiments of the ultra-short pulse generator of the invention control of the activation of the laser of the optical setup allows the Bragg grating to be turned on and off at will.

In embodiments of the ultra-short pulse generator of the invention the phase mask of the optical setup is a chirped phase mask. In these embodiments, when high intensity pulses from the laser of the optical setup pass through the chirped phase mask, a chirped transient grating is formed in the waveguide. These embodiments of the ultra-short pulse generator of the invention can be configured to be used for pulse stretching or pulse compression in ultra-fast fiber laser systems.

In a third aspect the invention is a fast spectral switch comprising as an input at least two continuous wave (CW) wavelengths of laser radiation that are injected into an optical waveguide via a circulator or a beam splitter and at least two optical setups of the first aspect of the invention. Each of the optical setups is configured to produce for each pulse of the laser of that optical setup a transient Bragg grating that is designed to reflect a different specific CW wavelength of the at least two CW wavelengths back to the circulator or beam splitter. When none of the transient gratings are active all wavelengths are transmitted through the waveguide and when one of the transient gratings is activated the corresponding wavelength is reflected and appears at the output of the circulator or beam splitter.

In embodiments of the fast spectral switch of the invention applying fast and synchronized triggering to each of the transient gratings will allow for fast switching of the reflected/transmitted light at different wavelengths depending on the synchronization of the pulses emitted by the lasers of the at least two optical setups.

In embodiments of the fast spectral switch of the invention at least one of the phase masks of the at least two optical setups is a chirped phase mask. In these embodiments when high intensity ultra-fast pulses from the laser of the optical setup passes through the chirped phase mask, a chirped transient grating is formed in the waveguide. These embodiments of the fast spectral switch of the invention can be configured to be used for pulse stretching or pulse compression in ultra-fast fiber laser systems.

In a fourth aspect the invention is a Q-switched laser comprising:
a) a length of active fiber that acts as the gain medium;
b) a permanent reflecting mirror at one end of the fiber;
c) an optical setup of the first aspect of the invention at the other end of the fiber; and
d) a pump source coupled to the active fiber;

Initially the laser of optical setup is not activated, a transient grating is not formed in the active fiber, there is no oscillation, and the gain builds up in active fiber. Then the laser of the optical setup is activated forming a transient Bragg grating in the active fiber. The permanent mirror and transient Bragg grating form a resonator in which oscillation occurs and a Q-switched pulse is formed at the output of the active fiber.

In embodiments of the Q-switched laser of the invention the permanent mirror is partially reflecting and acts as the output coupler of the laser and the transient Bragg grating is 100% reflecting.

In embodiments of the Q-switched laser of the invention the transient Bragg grating is partially reflecting and acts as the output coupler of the laser and the permanent mirror is 100% reflecting.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

Figure 1:
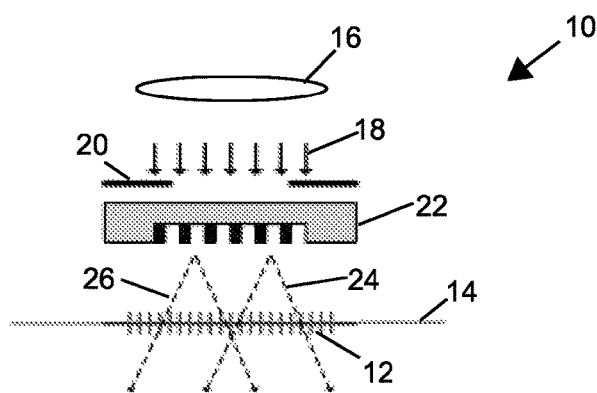
FIG. 1 schematically shows the optical setup of the method of the invention for producing a transient Bragg grating in an optical fiber.

The method of the invention for realizing a transient grating in an optical waveguide comprises aiming a pulsed "pump" beam at the fiber/waveguide from the side through a phase mask to create a temporary spatial modulation of the core refractive index. The waveguide can be an optical fiber, rectangular waveguide, or other optical waveguides of any shape made of different materials such as Silica, Silicon, GaAs, GaN, Chalcogenide, and Fluoride (but not limited to these materials). Herein optical fibers are generally used to illustrate the invention; however it is to be understood that in many cases the optical fiber can be replaced by another form of waveguide.

One mechanism for modulating the core refractive index along the fiber is the Kerr nonlinearity, which offers instantaneous changes on femto-second scale. When a $\chi^3$ material is illuminated with high intensity, its refractive index can be written as: $n=n_0+n_2I$, where $n_0$ is the material refractive index in the absence of illumination and $n_2$ is the material nonlinear refractive index coefficient which describes its response to the illumination intensity I. This type of nonlinearity is especially strong in highly nonlinear materials, such as Chalcogenide fibers and waveguides or silicon waveguides, but is present in all isotropic materials including standard Silica fibers.

Another mechanism for achieving refractive index change, which is applicable to semiconductor materials in specific wavelength regimes, is free-carrier generation. In this case absorption of incoming light causes an increase of the free carrier density in the conduction band. The effect of the free carrier density changes on the refractive index can be orders of magnitude stronger than the Kerr effect in materials with the highest Kerr nonlinearities. However, unlike the Kerr effect, the generated carriers persist after the passage of the pump energy, usually for a period of time no shorter than several 10's of picoseconds, which is the time-scale required for electron-hole recombination.

A third mechanism for achieving refractive index change is linear and non-linear absorption of the laser energy leading to a thermal grating, which results in an index of refraction grating. This mechanism has a fast turn-on time but the effect will persist until heat diffusion "erases" the grating, typically on the ns-µs time scale.

In addition there are additional physical mechanisms known in the art that cause a modification of the index of refraction of the core and/or cladding that may be used to produce the transient Bragg gratings.

The overall reflection efficiency of the transient gratings depends on a combination of parameters such as the strength and contrast of the grating, its time duration, spatial length and spectral overlap with the probe light propagating in the waveguide. The inventors have performed analytical estimates that show that with high peak power pulsed lasers transient refractive index changes of $10^{-3}$ or $10^{-4}$ are possible with the Kerr mechanism and even higher for free carrier generation or other mechanisms that will allow for high reflection transient gratings in waveguide lengths of mm's.

FIG. 1 schematically shows the optical setup 10 of the method of the invention for producing a transient Bragg grating 12 in an optical fiber 14 using an ultra-fast laser (not shown in the figures). The laser emits high intensity ultra-fast pulses, e.g. femtosecond, picosecond, or nanosecond pulses. Typically, the laser peak power should be lower than that required for permanent grating inscription. Alternatively, the fiber can be pretreated using high peak power illumination so that its permanent index change is saturated then the laser peak power can be increased above the saturation level to produce a transient grating. The radiation 18 from the laser (indicated by the parallel arrows) passes through cylindrical lens 16, which forms it into a line that is focused on the optical fiber 14 (or waveguide). Between lens 16 and optical fiber 14 the radiation 18 passes through an aperture 20 and phase mask 22. The +1$^{st}$ order and −1$^{st}$ order diffraction patterns of each pulse created by phase mask 22 interfere to create high intensity points along the fiber core (waveguide) at a spatial period determined by the phase mask, thus, forming a Bragg grating 12. In the figures interference of the first order diffraction patterns is shown; however diffraction patterns of other orders can interfere to create Bragg grating 12.

The method of the invention for obtaining a transient grating in an optical fiber or waveguide can be exploited in a variety of applications in photonics. As examples four applications based on transient gratings in fibers/waveguides are described herein below.

Figure 2:
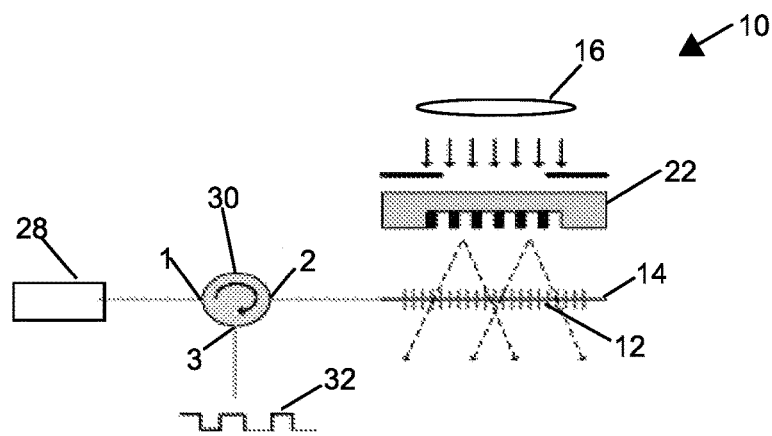
FIG. 2 schematically shows how an ultra-fast fiber laser source at any central wavelength can be produced using the optical setup of FIG. 1.

A first exemplary application of the transient Bragg grating produced by the method of the invention is illustrated in FIG. 2. There is a constant effort to increase data transfer rate in optical communication in order to comply with growing demand. One of the limitations in this field is the modulation of laser sources by electronic means. The emission of a light pulse is limited to a few GHz by fast electronics and is limited to a specific central wavelength determined by the laser source.

FIG. 2 schematically shows how the transient gratings produced using the optical setup 10 of FIG. 1 can be used as an ultra-fast light modulator on ultra-fast time scales, enabling generation of ultra-short pulses at different wavelengths to produce an ultra-fast fiber laser source at any central wavelength. In this application a CW signal laser source 28 delivers light to an optical waveguide or fiber 12 via the entrance port 1 of an optical circulator 30 (note that circulator 30 can be replaced with a beam splitter—not shown in the figures). A pulse from a pulsed pump laser passes through cylindrical lens 16 and phase mask 22 and is aimed at the optical waveguide/fiber 14 from the side producing, by any of the mechanisms described herein above, a transient Bragg grating 22 at port 2 of circulator 30 in the waveguide/fiber 14 at the time of the pulse. If the grating period is correctly matched to the wavelength of the source 28 then each time a pulse is fired on the waveguide/fiber 12 a reflected pulse 32 of duration comparable to the pump duration will be observed at the output port 3 of the circulator 30. If the transient time of the grating is short then the reflected pulse will be short and centered on the CW frequency. If ultra-short pump pulses are used (ps/fs) then the reflected pulse duration depends on the pump pulse duration, on the spatial length of the grating, or on both, depending on the various parameters. Nevertheless, the reflected pulse can be very short (fs's) and thus possess a wide bandwidth. In principal, a narrowband CW laser is converted here to ultra-short pulses with a much wider spectral bandwidth. With this scheme one can obtain ultra-short pulses at an arbitrary central wavelength, by choosing the CW source wavelength, and the appropriate phase mask.

Importantly, the central frequency of the reflected light (which equals that of the CW input) is determined by the grating period; the latter can be, in principle, adapted to any wavelength. Thus, it will be possible to create the Bragg grating with a low power ultra-fast oscillator. This will be the first source that can generate ultra-short pulses at practically any desired wavelength.

With relatively long-duration transient gratings, based on free carrier generation, it will be possible to realize laser sources with pulse duration in the range of 200 ps-1 ns. Currently, this range is very hard to reach because it is too long for mode-locking and too short for Q-switching.

Figure 3:
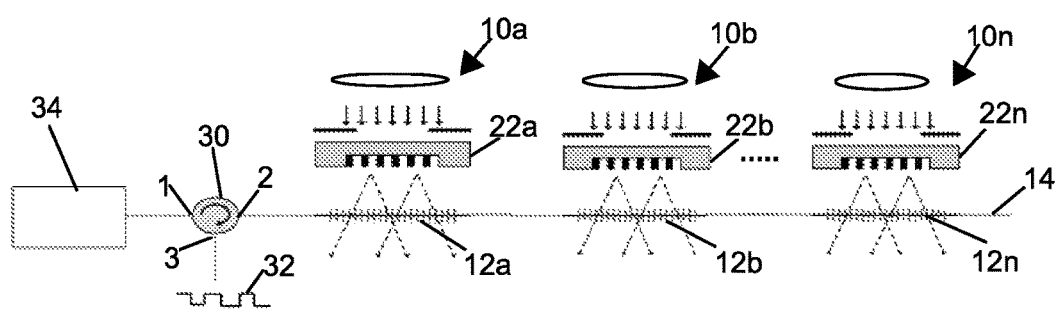
FIG. 3 schematically shows a fast spectral switch based on multiple transient Bragg gratings produced by the method of the invention.

A second exemplary application of the transient Bragg grating produced by the method of the invention is a fast spectral switch based on multiple transient Bragg gratings. In this application different wavelengths can propagate in an optical waveguide, for example an optical fiber. This application is schematically illustrated in FIG. 3.

Multiple continuous wave (CW) wavelengths 34 are launched into port 1 of circulator 30. Port 2 of the circulator is connected to multiple transient gratings produced by one or more of the optical setups 10a, 10b, ..., 10n shown in FIG. 1. Each optical setup comprises a pump laser source that emits high intensity ultra-fast pulses and a phase mask 22a, 22b, ..., 22n. The pump lasers can be the same or different but each of the phase masks is different so that each of the optical setups can produce a different transient grating 12a, 12b, ..., 12n along the waveguide 14, each of which is designed to reflect a specific wavelength of the input 34. When none of the transient gratings is active, all wavelengths are transmitted through. When one of the transient gratings is turned on the corresponding wavelength is reflected and appears at the output port 3. Applying fast and synchronized triggering to the transient gratings will allow for fast switching of the reflected/transmitted light at different wavelengths depending on the synchronization of the pump pulses. This can provide a multiple color, complex, ultra-fast source.

Figure 4:
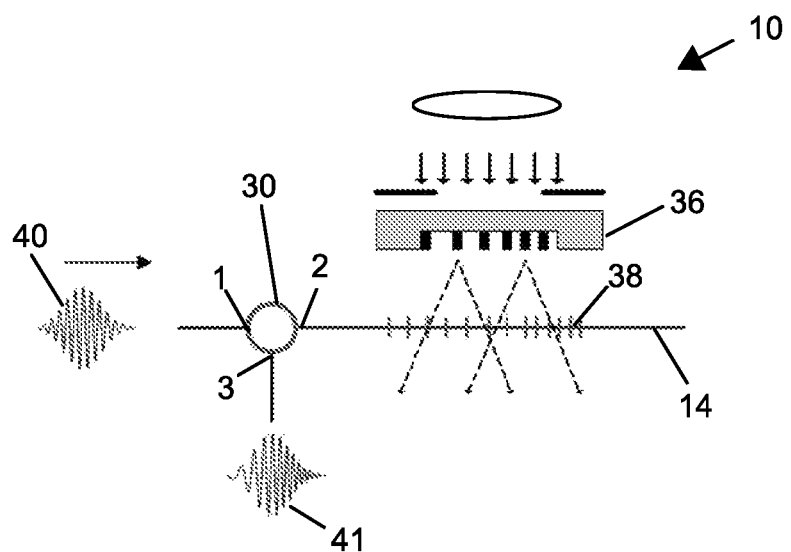
FIG. 4 schematically illustrates a transient chirped Bragg grating produced according to the method of the invention.

A third exemplary application of the transient Bragg grating produced by the method of the invention is a transient chirped Bragg grating that can be used for transient pulse stretching or compression. FIG. 4 schematically illustrates this application.

In this application of the method of the invention laser pulses 40 are launched into port 1 of circulator 30. Port 2 of the circulator is connected to transient grating 38 produced by optical setup 10. High intensity ultra-fast pulses from a pump laser pass through a chirped phase mask 36. During each pulse a chirped transient grating 38, i.e. a Bragg grating with a non-constant grating period, will be produced that reflects chirped pulses 40 back through fiber 14 to exit port 3 of circulator 30. Control of the activation of the pump laser allows the Bragg grating to be turned on and off at will. One use of this application is pulse stretching or pulse compression in ultra-fast fiber laser systems. Different wavelengths and different chirp patterns can be obtained using several pump lasers and several phase masks along the optical waveguide as shown in FIG. 3.

A fourth exemplary application of the transient Bragg grating produced by the method of the invention is in Q-switching fiber lasers. In recent years rare-earth doped fiber lasers have attracted considerable attention due to their good beam confinement, excellent heat dissipation, spatial beam quality, and high efficiency. Q-switched pulsed lasers have many applications in industrial processing, position measurement, and medical treatments owing to their high peak power relative to CW operation. Improving current fiber Q-Switching designs will have a direct impact on the fiber laser performance and peak power.

Figure 5:
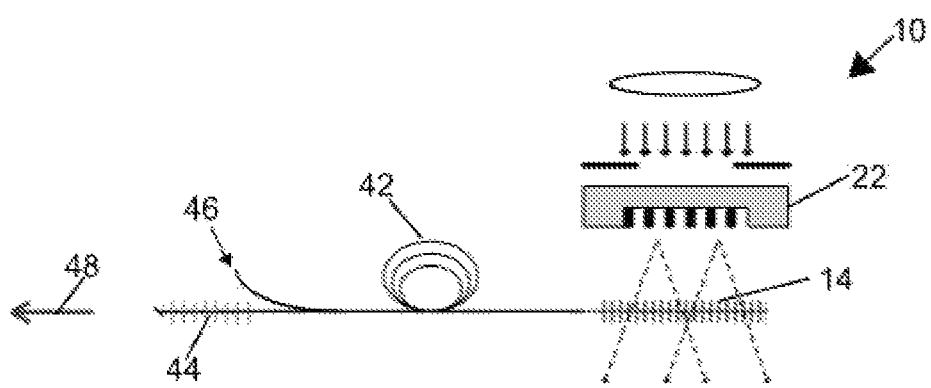
FIG. 5 schematically illustrates how the transient Bragg grating produced by the method of the invention can be used to Q-switch a fiber laser.

FIG. 5 schematically illustrates how the transient Bragg gratings produced by the method of the invention can be exploited to achieve Q-switching of a fiber laser by turning "on" one of the laser mirrors at the right time (in a similar manner to a rotating prism Q-switch).

At one end of active fiber 42, e.g. an active Yb-fiber, is located a permanent partially reflecting mirror that acts as output coupler 44. At the other end of active fiber 42 is an optical setup 10 that is used to create a 100% reflecting transient Bragg grating 12 when the pump laser of optical setup 10 is activated. The pump 46 of the fiber laser is coupled to the active fiber 42 that serves as a gain media. Initially the transient grating 12 is off, there is no oscillation, and the gain builds up in fiber 42. Then the pump laser of optical setup 10 is activated turning the transient Bragg grating 12 on, a resonator in which oscillation occurs is formed, and a Q-switched pulse 48 is formed at the output. As opposed to standard Q-switching techniques, this scheme provides extreme precision in the timing of the pulse, and can be done within the active fiber meaning that there are no free-space expensive elements and that the laser has a high damage threshold.

In short length lasers the duration of the mirror must be relatively long, on the order of ns. This means that the Kerr effect should be maintained for relatively long durations or the mechanism of the formation of the transient grating can be based on free carrier generation, effects that can have the required time-scale. It is noted that the same Q-switching effect can be achieved by switching the locations of the permanent mirror, which in this case should be 100% reflecting, and the transient Bragg grating, which in this case should only be partially reflecting in order to act as an output coupler.

Although embodiments of the invention have been described by way of illustration, it will be understood that the invention may be carried out with many variations, modifications, and adaptations, without exceeding the scope of the claims.

BIBLIOGRAPHY

1. A. Othonos, K. Kalli, D. Pureur, and A. Mugnier. "Fibre Bragg Gratings," Wavelength Filters in Fibre Optics (2006): 189-269.
2. S. Y. Li, N. Q. Ngo, S. C. Tjin, P. Shum, and J. Zhang. "Thermally tunable narrow-bandpass filter based on a linearly chirped fiber Bragg grating," *Opt. Left.* 29, 29 (2004).
3. M. M. Ohn, A. T. Alavie, R. Maaskant, M. G. Xu, F. Bilodeau, and K. 0. Hill. "Dispersion variable fibre Bragg grating using a piezoelectric stack," *Electron. Lett.* 32, 2000 (1996).
4. V. E. Perlin and H. G. Winful, "Nonlinear pulse switching using cross-phase modulation and fiber Bragg gratings," *IEEE Photon. Technol. Lett.* 13, 960 (2001).
5. A. Melloni, M. Chinello, and M. Martinelli, "All-optical switching in phase-shifted fiber Bragg grating."*IEEE Photon. Technol. Lett.* 12, 42 (2000).
6. M. Notomi, "Manipulating light with strongly modulated photonic crystals," Rep. Prog. Phys. 73, 096501 (2010).
7. A. Othonos. "Probing ultra-fast carrier and phonon dynamics in semiconductors," J. Appl. Phys. 83, 1789 (1998).

The invention claimed is:

1. An ultra-short pulse generator comprising an optical setup for forming a transient Bragg grating in an optical waveguide used as an ultra-fast light modulator in an optical waveguide, the optical setup comprising:
 a) an ultra-fast laser configured to emits high intensity ultra-fast pulses;
 b) a cylindrical lens configured to form radiation emitted by the laser into a line that is focused on the optical waveguide; and
 c) a phase mask located between the aperture and the optical waveguide;
 wherein, diffraction patterns created by the phase mask for each pulse interfere to create refractive index changes at high intensity points along the waveguide at a spatial period determined by the phase mask, the wavelength, and the specific material of the waveguide, such that said refractive index changes are reversed when the radiation ceases to be focused on the waveguide, thereby forming a transient Bragg grating;
 wherein, continuous wave (CW) laser radiation is injected into the optical waveguide via a circulator or a beam splitter and wherein for each pulse of the laser of the optical setup a transient Bragg grating is formed in the waveguide reflecting the CW laser radiation back to the circulator or beam splitter which outputs a signal comprised of ultra-short laser pulses whose central wavelength is the same as that of the CW laser.

2. The ultra-short pulse generator of claim 1, wherein the pulse duration is in the range between 200 ps to 1 ns.

3. The ultra-short pulse generator of claim 1, wherein control of the activation of the laser of the optical setup allows the Bragg grating to be turned on and off at will.

4. The ultra-short pulse generator of claim 1, wherein the phase mask of the optical setup is a chirped phase mask; wherein, when high intensity pulses from the laser of the optical setup pass through the chirped phase mask, a chirped transient grating is formed in the waveguide.

5. The ultra-short pulse generator of claim 4 configured to be used for pulse stretching or pulse compression in ultrafast fiber laser systems.

6. The ultra-short pulse generator of claim 1, wherein the optical setup comprises an aperture located between the cylindrical lens and the phase mask.

7. The ultra-short pulse generator of claim 1, wherein the peak power of the laser in the optical setup is one of the following:
 lower than that required for permanent grating inscription; and
 higher than the saturation level of a fiber waveguide if the fiber waveguide has been pretreated using high peak power illumination so that its permanent index change is saturated.

8. The ultra-short pulse generator of claim 1, wherein the mechanism by which the refractive index changes take place in the optical setup is at least one of the following:
 a) the Kerr nonlinearity;
 b) free-carrier generation; and
 linear or non-linear absorption of laser energy resulting in a thermal grating.

9. A fast spectral switch comprising as an input at least two continuous wave (CW) wavelengths of laser radiation that are injected into an optical waveguide via a circulator or a beam splitter and at least two optical setups setup for forming a transient Bragg grating in an optical waveguide, each of the at least two optical setups comprising:
 a) an ultra-fast laser configured to emits high intensity ultra-fast pulses;
 b) a cylindrical lens configured to form radiation emitted by the laser into a line that is focused on the optical waveguide; and
 c) a phase mask located between the aperture and the optical waveguide;
 wherein, diffraction patterns created by the phase mask for each pulse interfere to create refractive index changes at high intensity points along the waveguide at a spatial period determined by the phase mask, the wavelength, and the specific material of the waveguide, such that said refractive index changes are reversed when the radiation ceases to be focused on the waveguide, thereby forming a transient Bragg grating;
 wherein each of the optical setups is configured to produce for each pulse of the laser of that optical setup a transient Bragg grating that is designed to reflect a different specific CW wavelength of the at least two CW wavelengths back to the circulator or beam splitter;
 wherein, when none of the transient gratings are active all wavelengths are transmitted through the waveguide and when one of the transient gratings is activated the corresponding wavelength is reflected and appears at the output of the circulator or beam splitter.

10. The fast spectral switch of claim 9, wherein applying fast and synchronized triggering to each of the transient gratings will allow for fast switching of the reflected/transmitted light at different wavelengths depending on the synchronization of the pulses emitted by the lasers of the at least two optical setups.

11. The fast spectral switch of claim 10, wherein at least one of the phase masks of the at least two optical setups is a chirped phase mask; wherein, when high intensity ultra-fast pulses from the laser of the optical setup pass through the chirped phase mask, a chirped transient grating is formed in the waveguide.

12. The fast spectral switch of claim 11 configured to be used for pulse stretching or pulse compression in ultra-fast fiber laser systems.

13. The fast spectral switch of claim 9, wherein the optical setup comprises an aperture located between the cylindrical lens and the phase mask.

14. The fast spectral switch of claim 9, wherein the peak power of the laser in the optical setup is one of the following:
   lower than that required for permanent grating inscription; and
   higher than the saturation level of a fiber waveguide if the fiber waveguide has been pretreated using high peak power illumination so that its permanent index change is saturated.

15. The fast spectral switch of claim 9, wherein the mechanism by which the refractive index changes take place in the optical setup is at least one of the following:
   a) the Kerr nonlinearity;
   b) free-carrier generation; and
   linear or non-linear absorption of laser energy resulting in a thermal grating.

16. A Q-switched laser comprising:
   a) a length of active fiber that acts as the gain medium;
   b) a permanent reflecting mirror at one end of the fiber;
   c) an optical setup for forming a transient Bragg grating in an optical waveguide at the other end of the fiber; and
   d) a pump source coupled to the active fiber;
   wherein, the optical setup comprises:
      a) an ultra-fast laser configured to emits high intensity ultra-fast pulses;
      b) a cylindrical lens configured to form radiation emitted by the laser into a line that is focused on the optical waveguide; and
      c) a phase mask located between the aperture and the optical waveguide;
   wherein, diffraction patterns created by the phase mask for each pulse interfere to create refractive index changes at high intensity points along the waveguide at a spatial period determined by the phase mask, the wavelength, and the specific material of the waveguide, such that said refractive index changes are reversed when the radiation ceases to be focused on the waveguide, thereby forming a transient Bragg grating; and
   initially the laser of optical setup is not activated, a transient grating is not formed in the active fiber, there is no oscillation, and the gain builds up in active fiber; then the laser of the optical setup is activated forming a transient Bragg grating in the active fiber; wherein the permanent mirror and transient Bragg grating form a resonator in which oscillation occurs and a Q-switched pulse is formed at the output of the active fiber.

17. The Q-switched laser of claim 16, wherein the permanent mirror is partially reflecting and acts as the output coupler of the laser and the transient Bragg grating is 100% reflecting.

18. The Q-switched laser of claim 16, wherein the transient Bragg grating is partially reflecting and acts as the output coupler of the laser and the permanent mirror is 100% reflecting.

19. The Q-switched laser of claim 16, wherein the optical setup comprises an aperture located between the cylindrical lens and the phase mask.

20. The Q-switched laser of claim 16, wherein the peak power of the laser in the optical setup is one of the following:
   lower than that required for permanent grating inscription; and
   higher than the saturation level of a fiber waveguide if the fiber waveguide has been pretreated using high peak power illumination so that its permanent index change is saturated.

21. The Q-switched laser of claim 16, wherein the mechanism by which the refractive index changes take place in the optical setup is at least one of the following:
   a) the Kerr nonlinearity;
   b) free-carrier generation; and
   linear or non-linear absorption of laser energy resulting in a thermal grating.

* * * * *